(12) United States Patent
Heath et al.

(10) Patent No.: US 8,233,926 B2
(45) Date of Patent: Jul. 31, 2012

(54) SPATIAL MODE ADAPTATION AT THE CELL EDGE USING INTERFERER SPATIAL CORRELATION

(75) Inventors: Robert Heath, Austin, TX (US); Tao Wu, Carlsbad, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1094 days.

(21) Appl. No.: 12/125,604

(22) Filed: May 22, 2008

(65) Prior Publication Data

US 2009/0291699 A1 Nov. 26, 2009

(51) Int. Cl.
*H04B 15/00* (2006.01)
(52) U.S. Cl. ...................................... 455/501
(58) Field of Classification Search .................. 455/501
See application file for complete search history.

(56) References Cited

U.S. PATENT DOCUMENTS

| | | | | |
|---|---|---|---|---|
| 2005/0276317 | A1* | 12/2005 | Jeong et al. | 375/213 |
| 2007/0153935 | A1* | 7/2007 | Yang et al. | 375/267 |
| 2007/0173261 | A1* | 7/2007 | Priotti et al. | 455/450 |
| 2010/0232525 | A1* | 9/2010 | Xia et al. | 375/259 |

FOREIGN PATENT DOCUMENTS

| | | |
|---|---|---|
| CN | 1969473 A | 5/2007 |
| EP | 1 804 395 A1 | 7/2007 |

OTHER PUBLICATIONS

Foschini, G. J., et al., "The Value of Coherent Base Station Coordination," 2005 Conference on Information Sciences and Systems (CISS), The Johns Hopkins University, Mar. 16-18, 2006, 6 pages.
Bengtsson, M., et al., "Measurements of Spatial Characteristics and Polarization with a Dual Polarized Antenna Array," IEEE 49th Vehicular Technology Conference, 1999, vol. 1, May 16, 1999-May 20, 1999, pp. 366-370, IEEE.
Shiu, D-S., et al., "Fading Correlation and Its Effect on the Capacity of Multielement Antenna Systems," IEEE Transactions on Communications, vol. 48, No. 3, Mar. 2000, pp. 502-513, IEEE.
Catreux, S., et al., "Adaptive Modulation and MIMO Coding for Broadband Wireless Data Networks," IEEE Communications Magazine, vol. 40, No. 6, Jun. 2002, pp. 108-115, IEEE.
Boelcskei, H., et al., "Impact of the Propagation Environment on the Performance of Space-Frequency Coded MIMO-OFDM," IEEE Journal on Selected Areas in Communications, vol. 21, No. 3, Apr. 2003, pp. 427-439, IEEE.
Szabo, A., et al., "On the Performance of Fast Feedback and Link Adaptation for MIMO Eigenbeamforming in Cellular Systems," ITG Workshop on Smart Antennas, 2004, Mar. 18-19, 2004, pp. 144-151, IEEE.

(Continued)

*Primary Examiner* — Duc Nguyen
*Assistant Examiner* — Ankur Jain
(74) *Attorney, Agent, or Firm* — Slater & Matsil, L.L.P.

(57) ABSTRACT

A system and method is proposed for adapting the spatial transmission strategy in a cellular MIMO (multiple input multiple output) communication system for the downlink. Spatial mode adaptation, the choice of multiplexing, transmit diversity, number of streams, space-time code family, and the like are performed slowly based on side information from other base stations. Base stations exchange their transmission plans with neighboring base stations and broadcast this information to active users. Each user measures its susceptibility to spatial interference and returns this information to the base station. The base station then schedules active users according to the decisions made in interfering base stations and the preferred transmission strategies of its own users.

22 Claims, 11 Drawing Sheets

OTHER PUBLICATIONS

Forenza, A., et al., "Impact of Antenna Geometry on MIMO Communication in Indoor Clustered Channels," IEEE Antennas and Propagation Society International Symposium, 2004, vol. 2, Jun. 20-25, 2004, pp. 1700-1703, IEEE.

Heath, R.W., et al., "Switching Between Diversity and Multiplexing in MIMO Systems," IEEE Transactions on Communications, vol. 53, No. 6, Jun. 2005, pp. 962-968, IEEE.

Part 16: Air Interface for Fixed and Mobile Broadband Wireless Access Systems, "Amendment for Physical and Medium Access Control Layers for Combined Fixed and Mobile Operation in Licensed Bands," IEEE Standard P802.16e/D12, Oct. 2005, 684 pages, IEEE.

McKay, M.R., et al., "A Throughput-Based Adaptive MIMO-BICM Approach for Spatially-Correlated Channels," IEEE International Conference on Communications, 2006, vol. 3, Jun. 2006, pp. 1374-1379, IEEE.

Liu, S., et al., "Analysis of Modulation and Coding Scheme Selection in MIMO-OFDM Systems," First International Conference on Communications and Electronics, 2006, Oct. 10-11, 2006, pp. 240-245, IEEE.

Forenza, A., et al., "Adaptive MIMO Transmission for Exploiting the Capacity of Spatially Correlated Channels," IEEE Transactions on Vehicular Technology, vol. 56, No. 2, Mar. 2007, pp. 619-630, IEEE.

Kotecha, J.H., et al., "Non-Collaborative Zero-Forcing Beamforming in the Presence of Co-Channel Interference and Spatially Correlated Channels," IEEE 66th Vehicular Technology Conference, 2007, Sep. 30, 2007-Oct. 3, 2007, pp. 591-595, IEEE.

Venkatesan, S., et al., "Network MIMO: Overcoming Intercell Interface in Indoor Wireless Systems," Conference Record of the 41st Asilomar Conference on Signals, Systems and Computers, 2007, Nov. 4-7, 2007, pp. 83-87, IEEE.

Andrews, J.G., et al., "Overcoming Interference in Spatial Multiplexing MIMO Cellular Networks," IEEE Wireless Communications Magazine, vol. 14, No. 6, Dec. 2007, pp. 95-104, IEEE.

IEEE Draft Standard for Information Technology—Telecommunications and information exchange between systems—Local and metropolitan area networks—Specific requirements Part 11: "Wireless LAN Medium Access Control (MAC) and Physical Layer (PHY) specifications Amendment 5: Enhancements for Higher Throughput," IEEE Unapproved Draft Standard P802.11n/D9.0, 2009, IEEE.

* cited by examiner

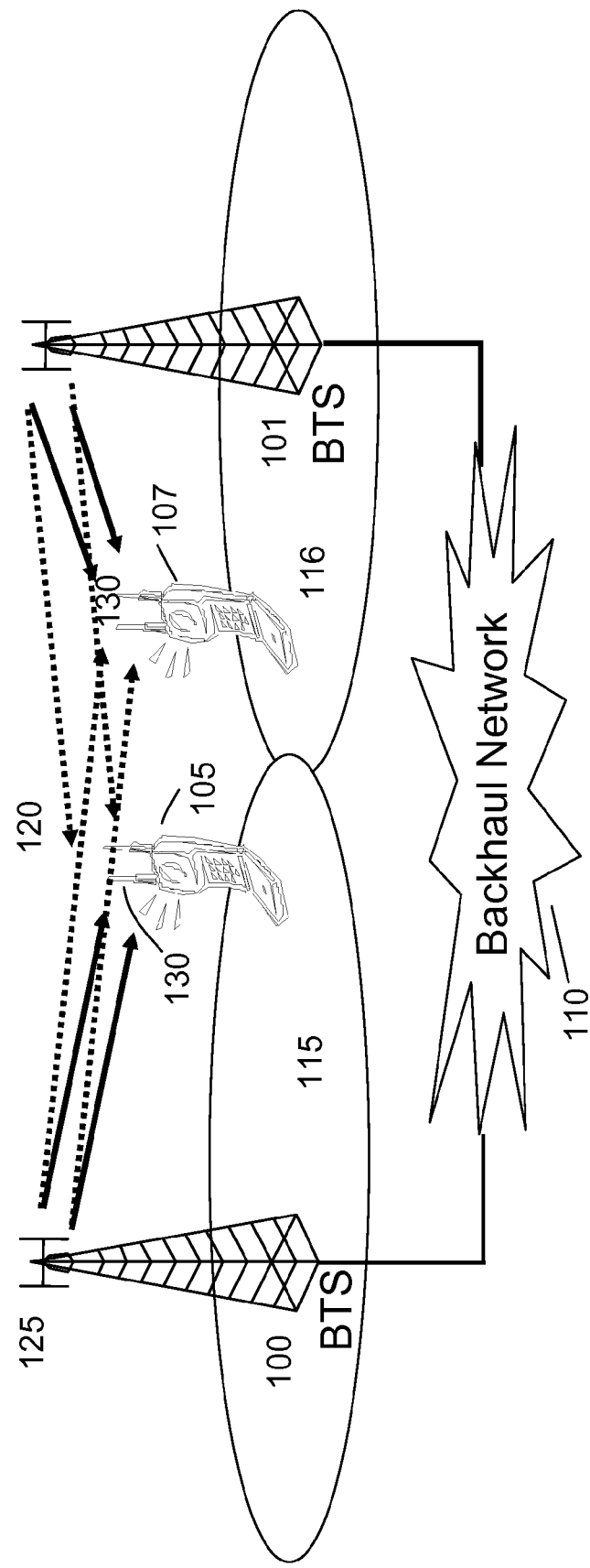

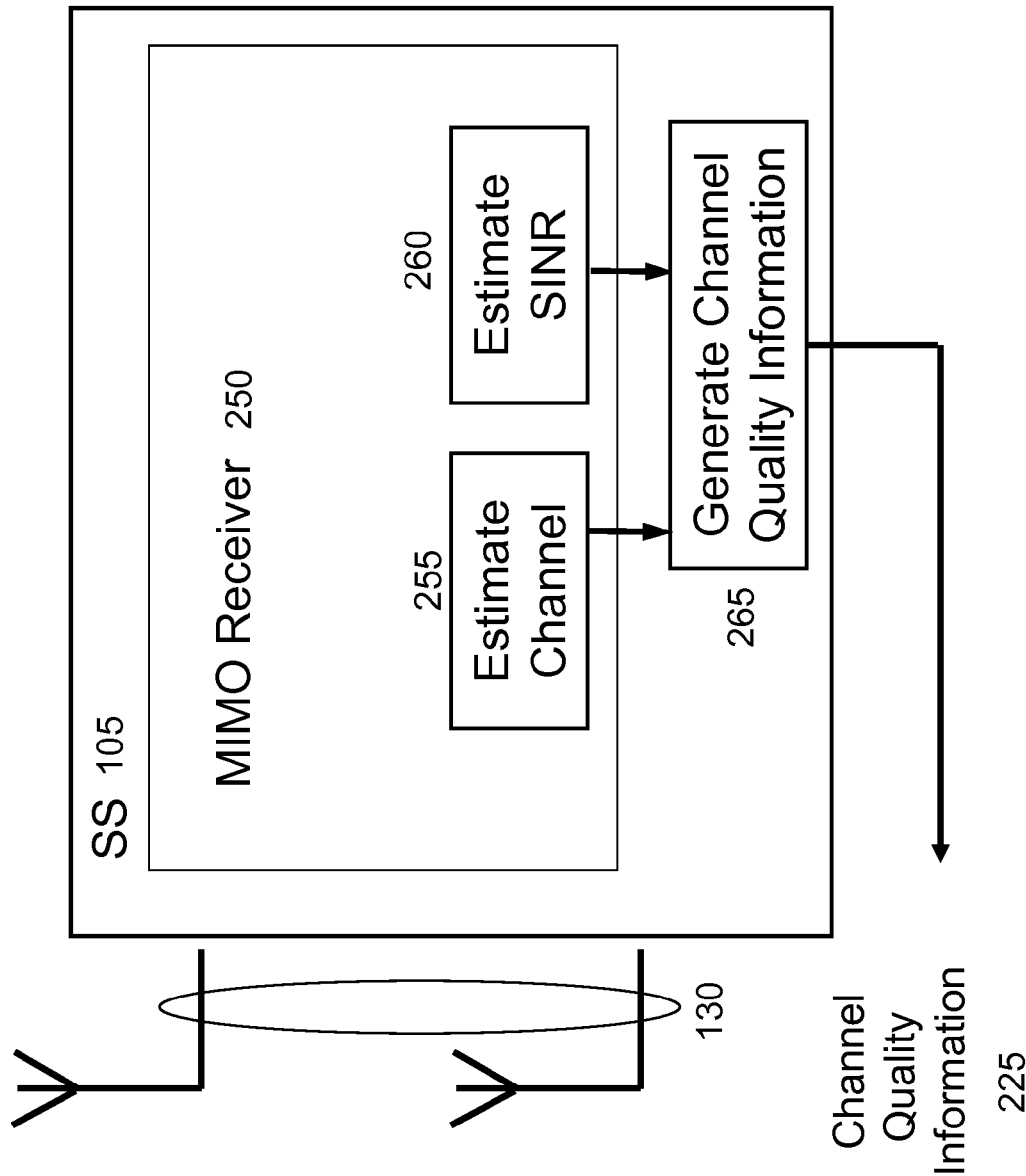

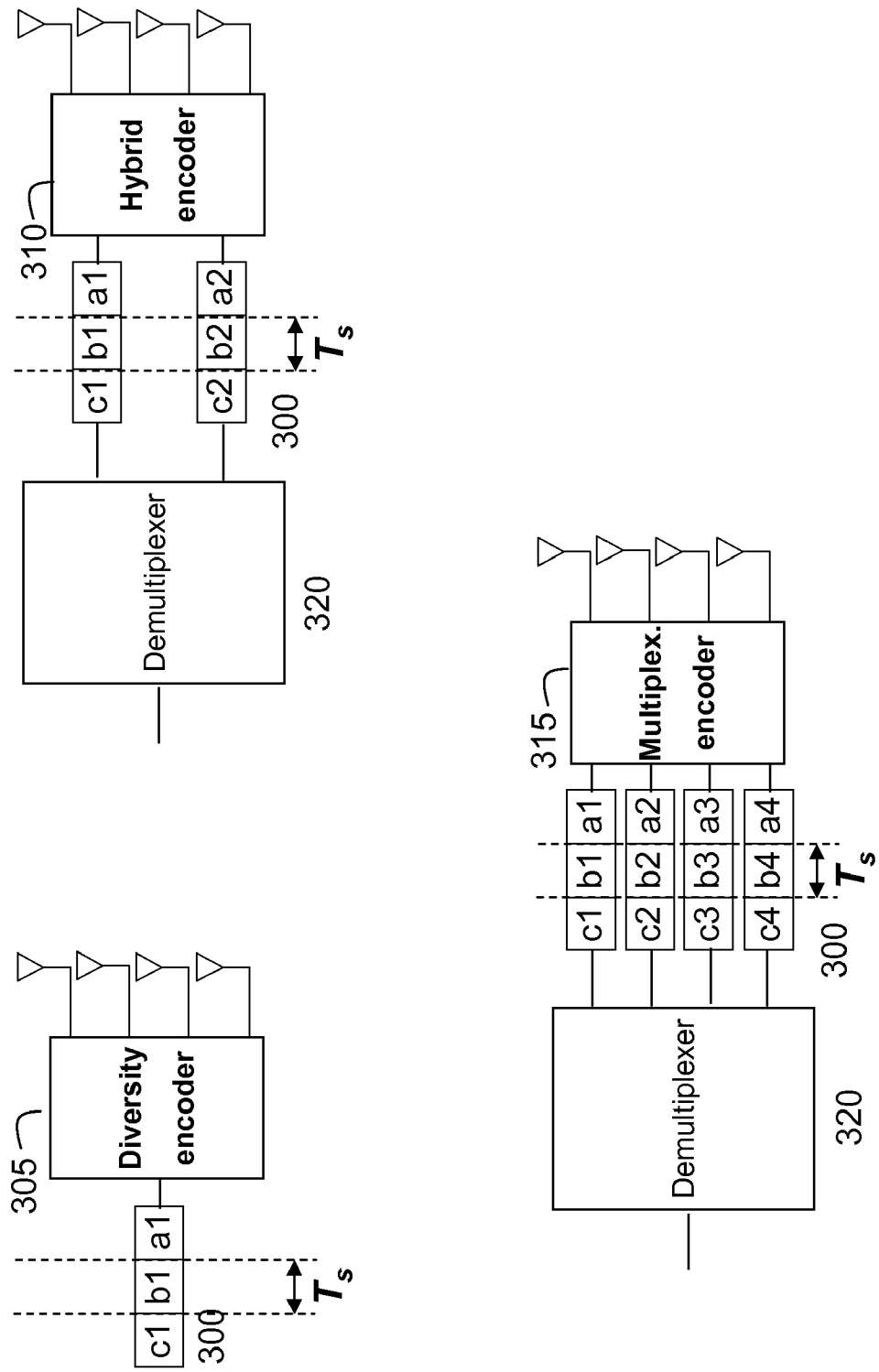
Fig. 3A Spatial Formatting

Fig. 3B Spatial Formatting Table

| SINR / Scenario | < 10dB | ~ 15dB | > 20dB |
|---|---|---|---|
| LOS, high corr. | Diversity | Diversity | Hybrid |
| LOS, low corr. | Diversity | Diversity | Hybrid |
| NLOS, high corr. | Diversity | Hybrid | Multiplex. |
| NLOS, low corr. | Diversity | Hybrid | Multiplex. |

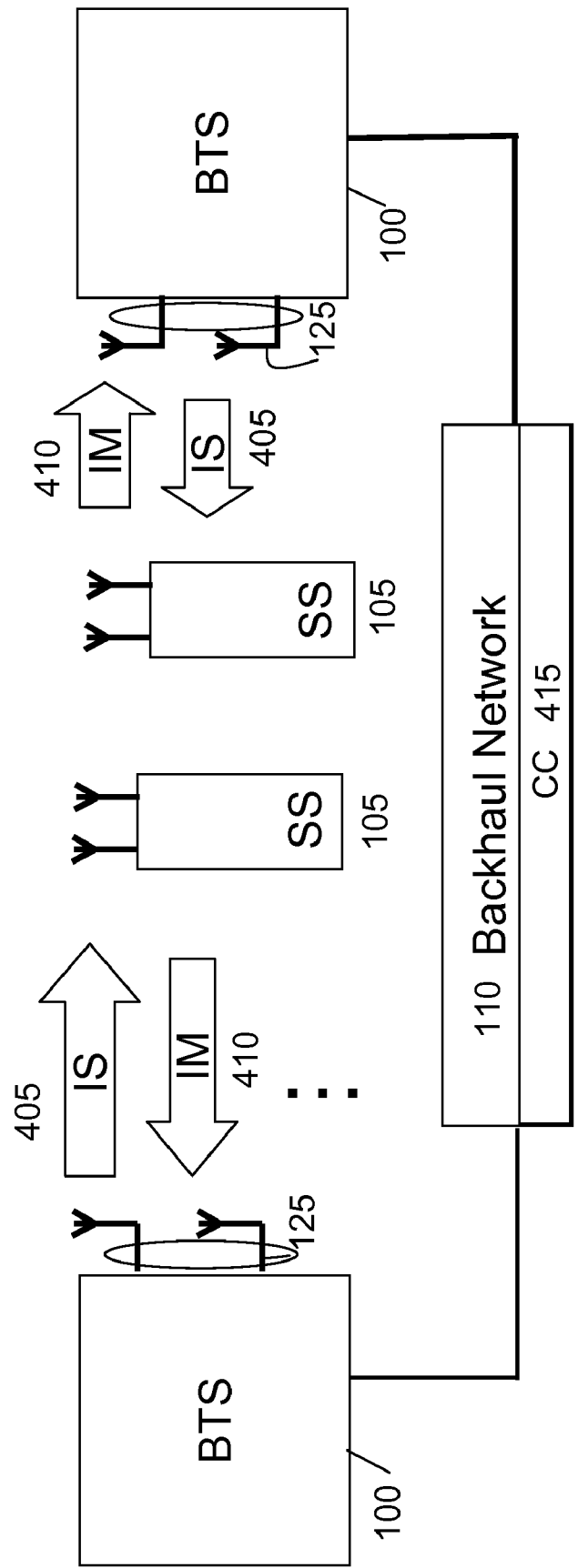
Fig. 4 System Overview

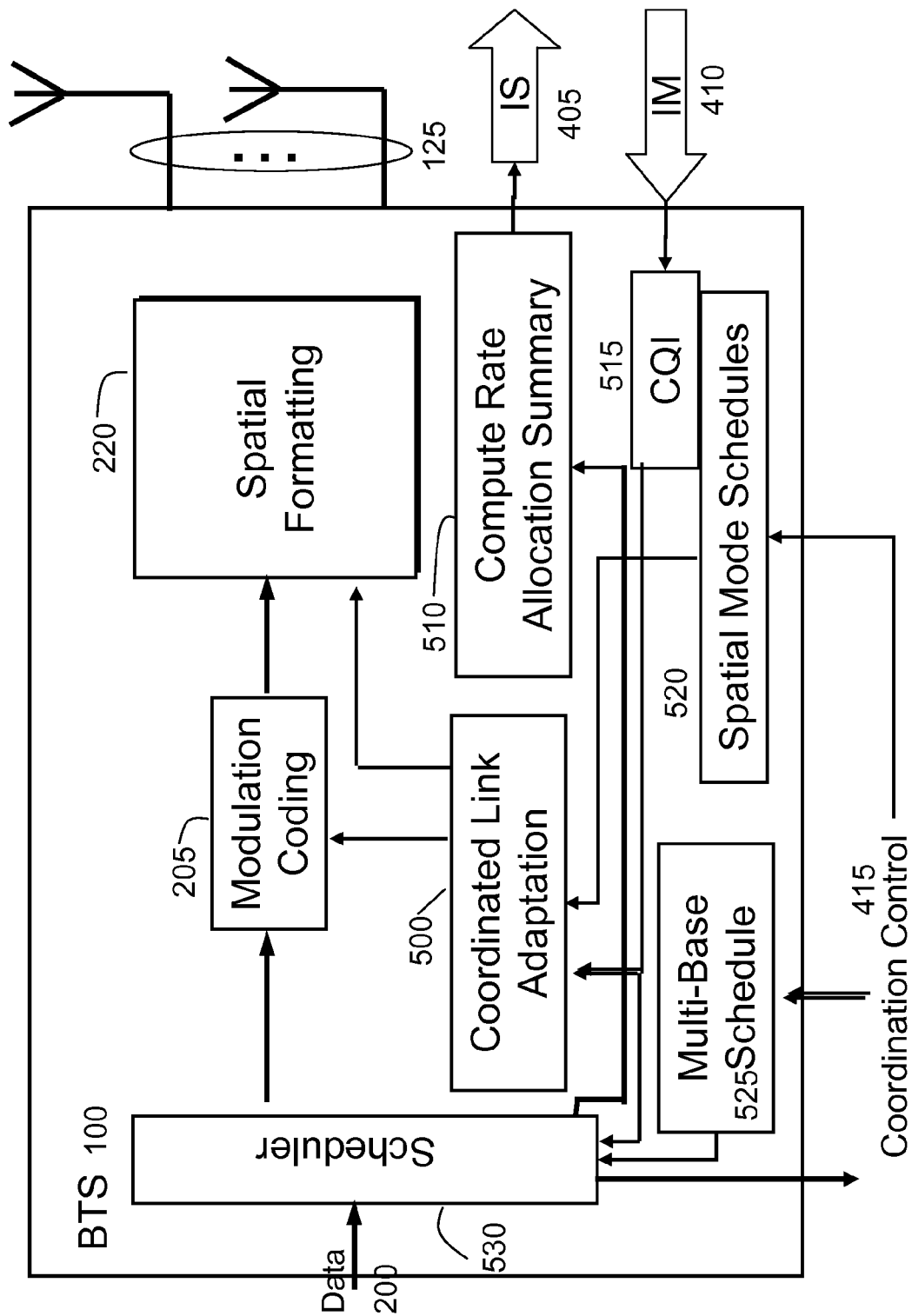
Fig. 5 Base Station Features

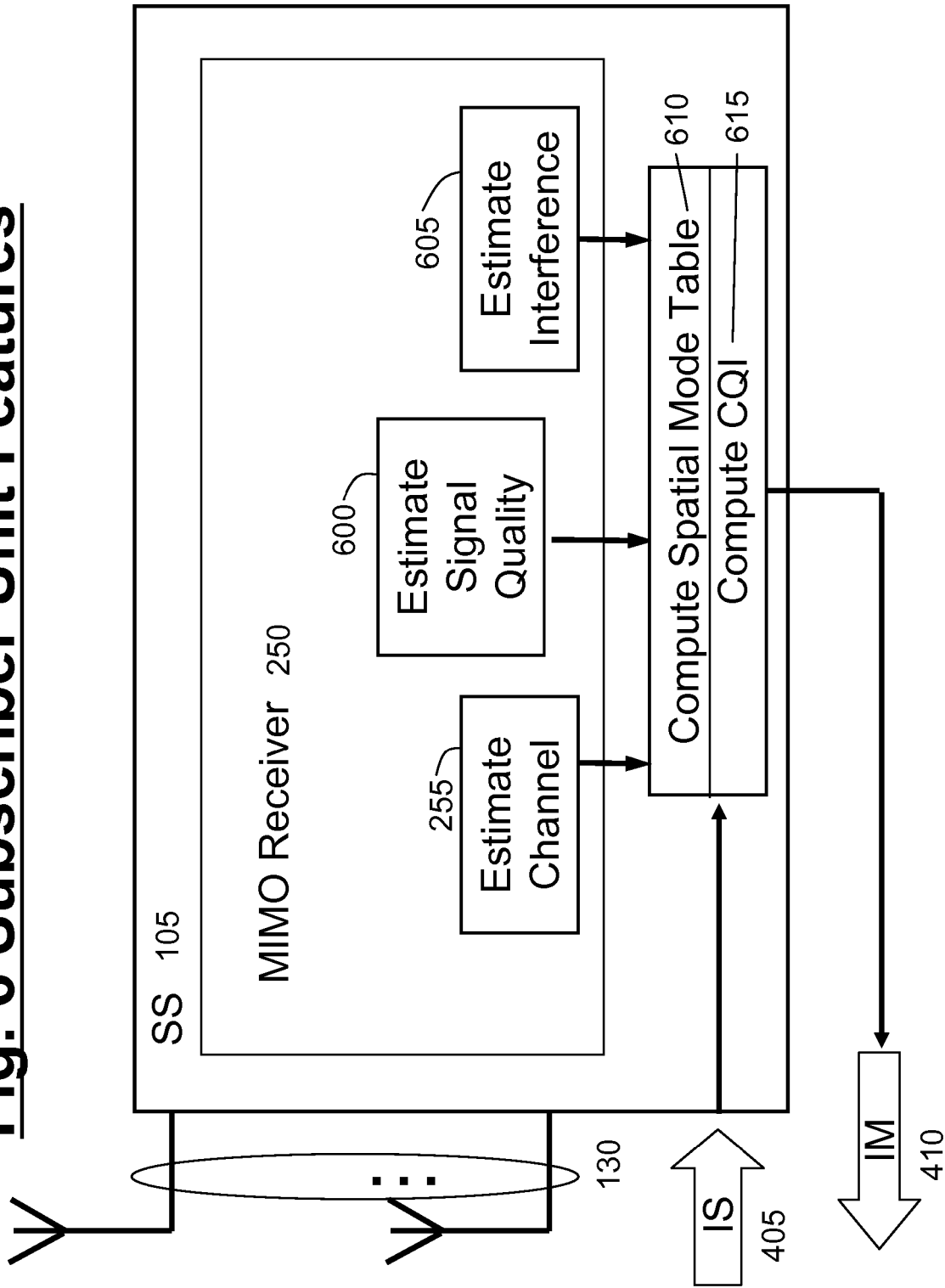

Fig. 7A Spatial Mode Table

| Interfering Mode | Preferred Mode |
|---|---|
| Beamforming | |
| Multiplexing | |
| None | |

705 → (Interfering Mode column)
710 → (Preferred Mode column)
700 → (table)

Compute Spatial Mode Table 610

Fig. 7B Spatial Mode Table with Rates

| Interfering Mode | Rate w/ BF | Rate w/ Mux |
|---|---|---|
| Beamforming | | |
| Multiplexing | | |
| None | | |

710   715   720

Compute Spatial Mode Table  610

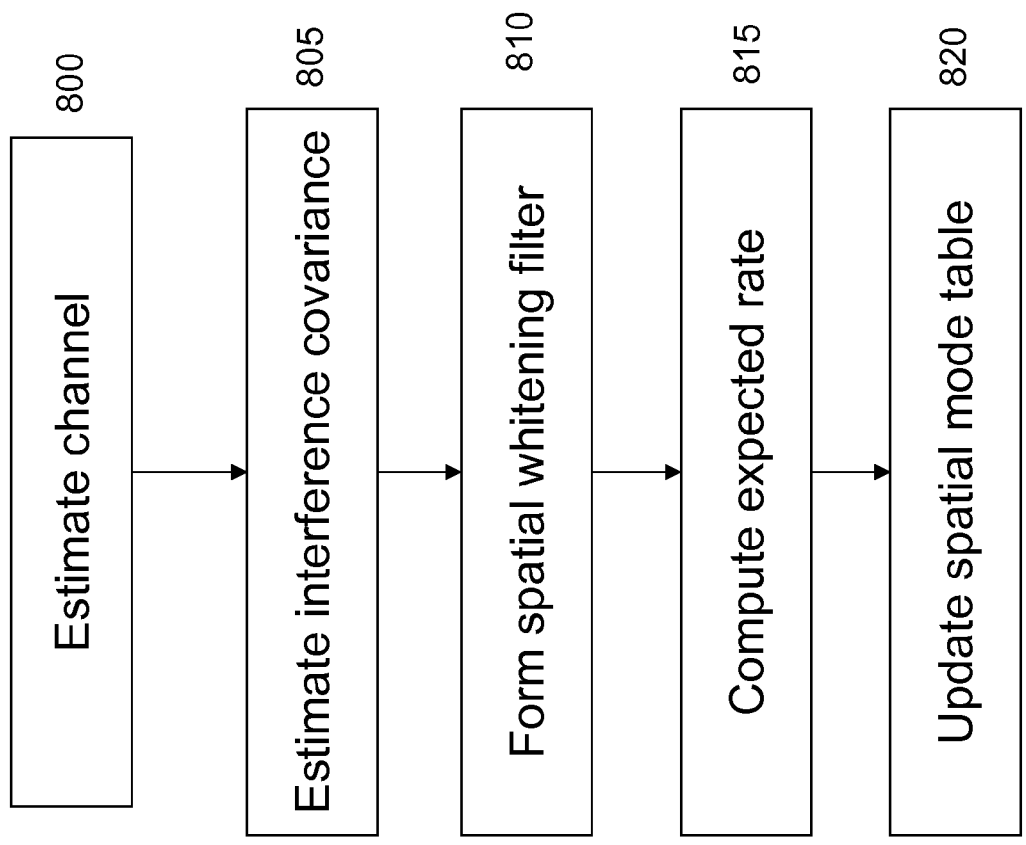
Fig 8 Computation Flow Chart

SPATIAL MODE ADAPTATION AT THE CELL EDGE USING INTERFERER SPATIAL CORRELATION

TECHNICAL FIELD

The present invention relates, in general, to wireless communications systems, and, more particularly, to adapting how data is transmitted to users that experience interference in a system with a plurality of transmit antennas.

BACKGROUND

Multiple-input multiple-output (MIMO) technology exploits the spatial components of the wireless channel to provide capacity gain and increased link robustness. After almost a decade of research, MIMO wireless communication has finally been adopted in several standards including IEEE 802.16e-2005 and IEEE 802.11n; products based on draft standards are already shipping. MIMO is often combined with OFDM (orthogonal frequency division multiplexing), a type of digital modulation that makes it easy to equalize broadband channels.

In MIMO communication systems, at the transmitter, data are modulated, encoded, and mapped onto spatial signals, which are transmitted from multiple transmit antennas. A main difference with non-MIMO communication systems is that there are many different spatial formatting modes for example beamforming, preceding, spatial multiplexing, space-time coding, and limited feedback preceding, among others (see A. Paulraj, R. Nabar, and D. Gore, Introduction to Space-Time Wireless Communications. 40 West 20th Street, New York, N.Y., USA: Cambridge University Press, 2003 and the references within). The spatial formatting techniques have different performance (in terms of capacity, goodput, achievable rate, or bit error rate for example) in different channel environments. Consequently, an advantageous component of MIMO wireless systems is adapting the transmitted rate in response to channel conditions in what is known as space-time adaptation, link adaptation, or adaptive space-time modulation.

In MIMO communication systems, space-time link adaptation involves adapting the transmitter in response to channel quality information to maximize a performance measure. As one example, prior work considers the joint adaptation of the modulation and coding rate with the spatial formatting to achieve a target performance measure. For example, as described in (R. Heath and A. Paulraj, "Switching between diversity and multiplexing in MIMO systems," IEEE Trans. Commun., vol. 53, no. 6, pp. 962-968, 2005) the transmitter may switch between a spatial multiplexing spatial formatting method and a spatial diversity spatial formatting method. As described in (S. Catreux, V. Erceg, D. Gesbert, and Heath, R. W., "Adaptive modulation and MIMO coding for broadband wireless data networks," IEEE Commun. Mag., vol. 40, no. 6, pp. 108-115, 2002), switching between spatial formatting methods substantially improves performance in MIMO wireless communication systems. The high throughput advantages of spatial multiplexing can be achieved when the spatial channel is sufficiently rich while the robustness advantages of spatial diversity can be achieved when the channel is severely fading.

Channel quality information is used to make adaptive modulation, coding, and spatial formatting decisions at the transmitter. Channel quality information may be obtained using a method known as reciprocity where the transmit channel is inferred from the received channel estimate or may be obtained through a feedback channel. When obtained through the use of a feedback channel, channel quality information is computed from measurements made at the receiver. Many different types of channel quality indicators may be used to help make adaptation decisions including signal strength, signal-to-noise ratio (SNR), single-to-interference-plus-noise ratio (SINR), quantized channel state information, limited feedback channel state information, and channel correlation, for example. The receiver may also compute the preferred modulation, coding, and spatial formatting mode and this may also constitute channel quality information.

In prior work, the channel quality information may be used in conjunction with a spatial formatting table to determine the appropriate spatial format. For example, the method in R. Heath and A. Paulraj, "Switching between diversity and multiplexing in MIMO systems," IEEE Trans. Commun., vol. 53, no. 6, pp. 962-968, 2005, used one bit of feedback from the receiver to improve error rate performance for fixed data rate transmission by switching between space-time block coding and spatial multiplexing. That approach can be combined with link adaptation in a straightforward fashion. The adaptive method in S. Catreux, V. Erceg, D. Gesbert, and Heath, R. W., "Adaptive modulation and MIMO coding for broadband wireless data networks," IEEE Commun. Mag., vol. 40, no. 6, pp. 108-115, 2002, was designed to enhance spectral efficiency in MIMO-OFDM communication systems using channel quality information in the form of statistical time/frequency selectivity indicators. Spatial correlation information has also been used to implement link adaptation, as described in A. Forenza, M. R. McKay, A. Pandharipande, R. W. Heath, and T. B. Collings, "Adaptive MIMO transmission for exploiting the capacity of spatially correlated channels," IEEE Trans. Veh. Technol., vol. 56, no. 2, pp. 619-630, March 2007 where statistical beamforming, spatial multiplexing, and double space-time block coding spatial formatting strategies are considered. When correlation based channel quality information is employed, the spatial formatting may be determined by the correlation, while the modulation and coding rate may be determine by other channel quality information and may vary more quickly.

A key assumption in prior work on space-time adaptation, or mode switching, is the absence of interference. Unfortunately, in most cellular wireless systems, especially at the cell edge, the communication link is interference limited. In what is known as the downlink of a cellular system, this means a subscriber being served in one cell receives a non-negligible amount of co-channel interference from transmitters in other cells. The presence of interference reduces the capacity and increases the bit error rate. This makes providing reasonable quality of service to users at the edge of the cell even more challenging.

Typically interference is modeled as colored noise. To compensate for this, receivers typically include a noise whitening filter, which is applied to the received signal based on an estimate of the interference plus noise covariance. As a result, the channel estimated at the receiver includes the effects of the whitening filter, and thus the effects of interference are present in the estimated channel. In wireless communication systems that do not employ MIMO communication technology, the interference may be treated as additional noise power. The corresponding methods for link adaptation may still work in this situation. Unfortunately, interference severely impacts performance in MIMO communication systems, especially when spatial multiplexing is used (see J. G. Andrews, W. Choi, and R. W. Heath, Jr., "Overcoming Interference in Multi-Antenna Cellular Networks," IEEE Wireless Communications, vol. 14, no. 6, pp. 95-104, December 2007). The reason is that the spatial formatting method in a given wireless cell is impacted by the choice of the spatial formatting method in the interfering cells. This can lead to a competitive scenario where cells update their spatial formatting methods in response to interference, but they themselves create interference forcing neighboring cells to change their spatial formatting method and so on.

The problem of link adaptation in MIMO systems including the effects of interference has been addressed in some prior work. Reference J. H. Kotecha and J. C. Mundarath, "Non-Collaborative Zero-Forcing Beamforming in the Presence of Co-Channel Interference and Spatially Correlated Channels," Proc. of Veh. Techn. Conf., September 2007. This paper also deals with interference in MIMO systems. It focuses on multi-user MIMO and does not allow any coordination between base stations. It simply derives a statistical solution Reference A. Szabo, N. Gengf, A. Klein, I. Viering, and J. A. Nossek, "On the performance of fast feedback and link adaptation for MIMO eigenbeamforming in cellular systems," Proc. of the ITG Workshop on Smart Antennas, pp. 144-151, 2004, studies the impact of interference on spatial mode adaptation in MIMO cellular systems. It also recognizes that even if statistical precoding is used at the transmitter, the optimum rates will change as a function of the interference covariance. This prior work recognizes that there is mismatch but does not propose a concrete solution to the problem of adapting in the presence of changing spatial interference.

Reference Shiming Liu, Xing Zhang, Wenbo Wang, "Analysis of Modulation and Coding Scheme Selection in MIMO-OFDM Systems," Proc. of Int. Conf. on Comm. and Electronics, pp. 240-245, Oct. 10-11, 2006, includes detailed system level simulations for a MIMO-OFDM system including the effects of interference and hybrid ARQ. This prior work, though, does not allow cooperation between base stations and does not consider the spatial effects of interference.

What is needed, then, is an improved system and method that for link adaptation that overcomes the above-described shortcomings in the prior art.

SUMMARY OF THE INVENTION

In accordance with one aspect, the present invention provides for a system for wireless communication. The system includes a plurality of base transceiver stations each respective base transceiver station having a plurality of antennas. The system further includes a plurality of subscriber stations each respective subscriber station being associated with one of the base transceiver stations, and a network connecting the base transceiver stations. The system further includes an interference schedule forward control channel carrying interference training signals from a base transceiver station to an associated subscriber station, and an interference measurement reverse control channel carrying preferred transmission mode data from a subscriber station to the associated base transceiver station.

In accordance with another aspect, the present invention provides for a method for wireless communications. A signal is transmitted from a base station to a subscriber station. The signal includes information regarding an interferer. The method includes receiving the signal at the subscriber station and using the information regarding an interferer to identify a preferred spatial mode for subsequent transmissions to the subscriber station. The method further includes transmitting the preferred spatial mode from the subscriber station to the base station.

In accordance with yet another aspect, the present invention provides for a communication protocol for a wireless communication network having a plurality of base transceiver stations, each of the plurality of base transceiver stations having associated therewith a respective plurality of subscriber stations. The protocol provides for a network interconnecting the plurality base transceiver stations, an interference schedule control channel whereby interferer information is fed from a respective base transceiver station to the respective plurality of subscriber stations associated therewith. The protocol further provides for an interference measurement control channel whereby preferred transmission mode data is fed from each respective subscriber station to the respective base station associated therewith, and wherein the preferred transmission mode data is determined at least in part from the interferer information.

An advantageous feature of the present invention is the ability to feed forward to a subscriber station information regarding potential interference from neighboring base stations and to feed back from the subscriber station a preferred spatial mode for subsequent transmissions to the subscriber station, thus providing for a more robust communication system in which interference from other base stations is compensated for.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a figure illustrating a wireless communication system with a plurality of antennas at the base station serving a plurality of subscriber stations;

FIG. 2B is a block diagram illustrating an idealized representation of prior art subscriber station functionality to support adaptive transmission in a multiple antenna system;

FIG. 3A illustrates three different spatial formatting techniques;

FIG. 3B is illustrates an exemplary spatial formatting table;

FIG. 4 is a block diagram illustrating an idealized representation of the components of a system in an embodiment of the present invention;

FIG. 5 is a block diagram illustrating an idealized representation of the components of a base transceiver station in an embodiment of the present invention;

FIG. 6 is a block diagram illustrating an idealized representation of the components of a subscriber station in an embodiment of the present invention;

FIG. 7A is a block diagram illustrating an exemplary spatial mode table with preferred modes employed in an embodiment of the present invention;

FIG. 7B is a block diagram illustrating an exemplary spatial mode table with rates recorded for each strategy illustrating example steps executed to implement an embodiment of the present invention; and FIG. 8 is flow chart illustrating exemplary steps executed to implement an embodiment of the present invention.

DETAILED DESCRIPTION OF ILLUSTRATIVE EMBODIMENTS

Figure 2A:
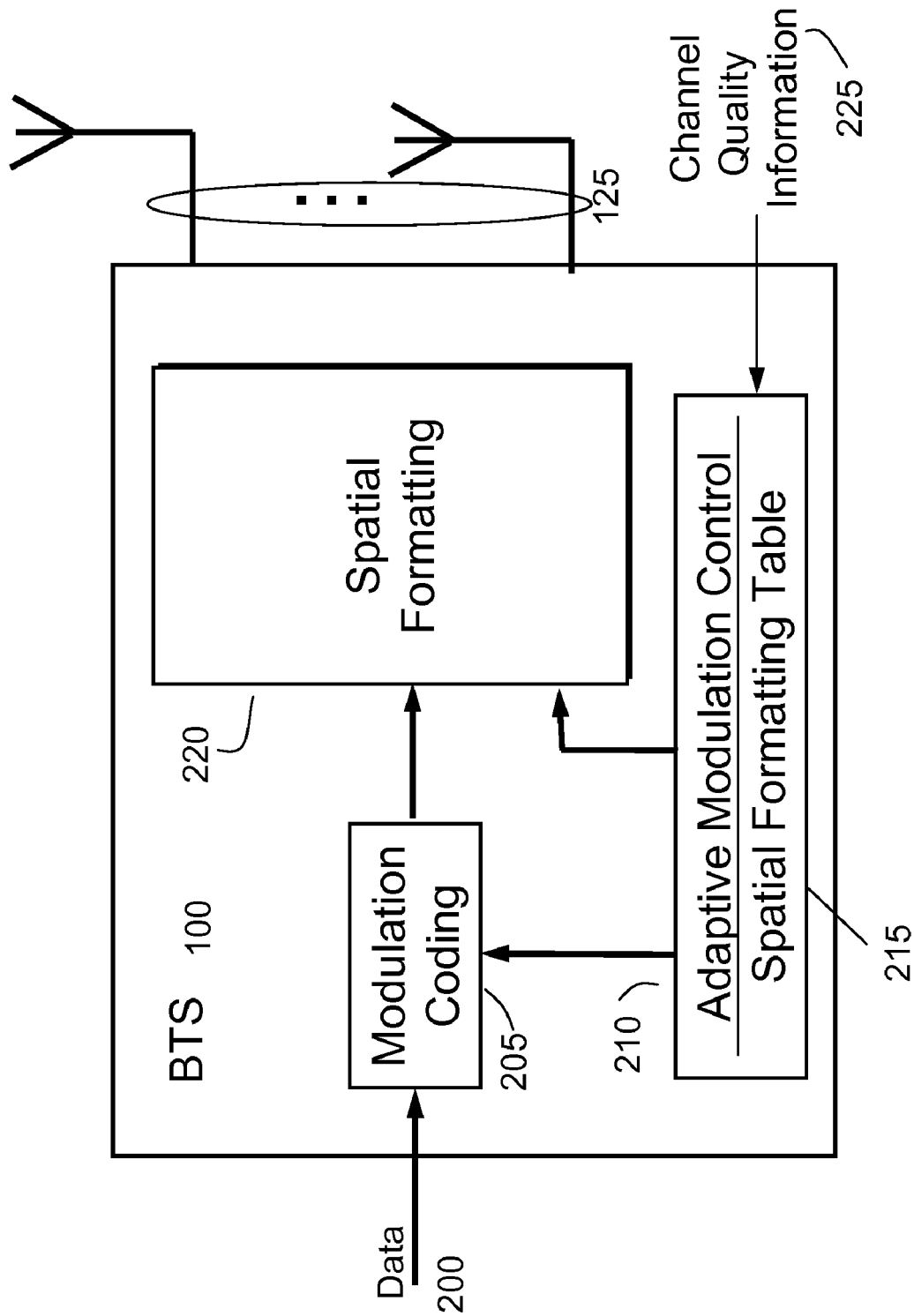
FIG. 2A is a block diagram illustrating an idealized representation of prior art base transceiver station functionality to support adaptive transmission in a multiple antenna system.

The present invention will be described herein in the context of a MIMO wireless communication system. Those skilled in the art will recognize that the inventive concepts described with reference to the preferred embodiments are limited to those described embodiments and can be extended to other embodiments, uses, and applications. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

FIG. 1 is a block diagram illustrating an idealized cellular communication system. Base transceiver station (BTS) 100 (sometimes also referred to as a base station) communicates with subscriber unit 105 (sometimes also referred to as a subscriber station), which may be mobile or fixed, using wireless communication. Although only one subscriber unit 105 is illustrated, it will be apparent to those skilled in the art that multiple subscriber units 105 will typically be employed in a typical wireless communication system. In the illustrated embodiment, BTS 100 communicates with subscriber unit 105 and a second BTS 101 communicates with subscriber unit 107. Also illustrated schematically is the interference signal between BTS 100 and subscriber unit 107, and between BTS 101 and subscriber unit 105, respectively. BTS 100, 101 each has a plurality of transmit antennas 125 while subscriber units 105, 107 each has a plurality of receive antennas 130, for the purpose of implementing what is known in the art as MIMO (multiple input multiple output) wireless communication. For clarity throughout this description the term BTS will be used to refer to both a singular base transceiver station and a to multiple base transceiver stations, the meaning being clear from the context. BTS 100 and 101 are connected through what is known as a backhaul network 110. Backhaul network 110 facilitates exchange of information between BTS and provides connection to external networks such as the Internet and the Public Switched Telephone Network. A cell is the conventional term for the coverage area of a BTS, such as cell 115 for BTS 100 and cell 116 for BTS 101. Subscriber units 105, 107 may experience co-channel interference from other BTS that are transmitting on the same carrier frequency, as is illustrated by the dashed lines in FIG. 1. This phenomenon is particularly pronounced along the edges or boundaries of a cell.

FIG. 2A is a block diagram illustrating an idealized prior art BTS system 100. Data 200, in the form of bits, symbols, or packets for example, are processed by modulation and coding block 205 to convert to transmitted symbols and to add redundancy for the purpose of assisting with error correction or error detection. The modulation and coding scheme is chosen based on input from the adaptive modulation control block 210. The output of modulation and coding block 205 is passed to spatial formatting block 220, which maps the input to multiple streams of data for transmission on transmit antennas 125. Spatial formatting block 220 may use any number of formatting methods known in the art including spatial multiplexing, space-time coding, delay diversity, the Alamouti code, double Alamouti space-time block code, preceding, beamforming, or the like. The choice of spatial formatting is also made on a decision from the adaptive modulation control block 210. In preferred embodiments, the modulation, coding and spatial formatting decisions are made jointly. Adaptive modulation control block 210 makes decisions based on channel quality information 225. The channel quality information input 225 may come from feedback from a subscriber unit, e.g. 105, to BTS 100 (see FIG. 1) or may be derived from measurements made at BTS 100. Channel quality information may, for purposes of illustration, be in the form of quantized channel measurements, modulation, coding, and/or spatial formatting decisions, received signal strength, signal-to-interference-plus-noise measurements, and the like. For example, the decision of modulation, coding, and spatial formatting may be made based on space-time-frequency mean and variance of post-processing signal-to-noise ratio at the receiver. Adaptive modulation control block 210 uses a spatial formatting table 215 when using channel quality information to make modulation, coding, and spatial formatting decisions. Spatial formatting table 215 may be a lookup table indexed by channel quality information in one embodiment or may be a mathematical function that uses the channel quality information as an input to output a modulation, coding, and formatting decision.

FIG. 2B is a block diagram illustrating an idealized prior art subscriber station system 105. Subscriber station (SS) 105 has a plurality of receive antennas 130 connecting through RF circuitry to a MIMO receiver signal processing block 250. Some of the key functions performed by MIMO receiver block 250 are channel estimation and estimation of signal-to-interference-plus-noise ratio (SINR). Channel estimation block 255 uses information inserted into the transmitted signal in the form of training signals, training pilots, or structure in the transmitted signal such as cyclostationarity to estimate coefficients of the channel between BTS 100 and SS 105. Channel coefficients are used by the MIMO receiver block 250 to help demodulate the received signal. MIMO receiver signal processing block 250 also implements an SINR measurement block in a preferred embodiment. In other embodiments, the signal power, interference power, and noise power are estimated separately. The ability of the MIMO receiver signal processing block 250 to correctly decode the transmitted data depends largely on the channel and the SINR. Thus this information is input into generate channel quality information block 265, which uses this information to generate a channel quality information signal 225 that is sent back to BTS 100 for control of the adaptive modulation control block 210.

FIG. 3A is a diagram that illustrates three illustrative approaches for spatial formatting operations in block 220 (of FIG. 2A). In one approach, coded symbols 300 from modulation and coding block 205 are input into a diversity encoder block 305. Diversity encoder 305 may implement any number of techniques known in the art, including the Alamouti code, space-time block code, space-time trellis code, delay diversity, transmit beamforming, and the like. The diversity encoder provides high reliability since the same coded information is sent across all of the transmit antennas. In a second approach, coded symbols from modulation and coding block 205 are input into a demultiplexer 320 to produce two streams of data. These two data streams are input into a hybrid encoder 310, which maps them to four transmit antennas using any number of algorithms known in the art including transmit precoding or double alamout space-time block code. This is called a hybrid encoder because there is more than one stream but fewer streams input into the hybrid encoder than antennas fed by the hybrid encoder. In a third approach, coded symbols from modulation and coding 205 are input into a demultiplexer 320 to produce four streams of data. These four streams are input into a spatial multiplexing encoder 315, which maps them to four transmit antennas directly or through some precoding means. By sending four data streams, the multiplexing encoder 315 may achieve higher rate (sending more uncoded bits per channel use) than the hybrid encoder but has more stringent channel and SINR requirements.

FIG. 3B illustrates an exemplary spatial formatting table 215. In this table, an SINR estimate generated from block 260 (FIG. 2B) is used to choose a column 355 in the table. Channel estimate from block 255 (FIG. 2B) is used to determine if the channel is line-of-sight or non-line-of-sight and has low spatial correlation or high spatial correlation. These parameters are used to choose the operating row 350. The entry of the table indicates a preferred spatial formatting from among the available approaches, e.g., the approaches illustrated in FIG. 3A. Another table may indicate preferred modulation and coding or these parameters may be stored jointly.

The challenge of spatial adaptation in cellular systems, which has not been properly addressed in the prior art, is the presence of interference. To explain this mathematically, consider narrowband MIMO communication systems, as are known in the art. The discrete-time received signals for a subscriber station 1 and a subscriber station 2 may be written $$y_1 = H_{11}s_1 + H_{21}s_2 + v_1$$

$$y_2 = H_{21}s_1 + H_{22}s_2 + v_2$$

where y1 y2 are the received signal vectors of dimensions Nr×1, where Nr is the number of receive antennas, s1 and s2 are the transmitted vector signals of dimension Nt×1 from base stations 1 and 2, where Nt is the number of transmit antennas at each base station. The Nr×Nt matrix Hkm refers to the matrix channel between the kth receiver and the mth transmitter. Finally, v1 and v2 are the vectors of additive noise coefficients. For purposes of explanation it is assumed that the number of transmit antennas at each base station is the same. Further, it is assumed that the number of receive antennas at each subscriber is also the same. It will be obvious to those skilled in the art how to make changes as appropriate.

In the presence of interference, s1 and s2 influence the received signals at both y1 and y2. Thus the decisions at one base station influence the ability of the subscriber units to make their own spatial modulation decisions. Thus prior work that neglected interference may not perform well in the presence of interference.

One of the challenges of dealing with out-of-cell interference is that unchecked interference will become what is called a competitive game. For example, suppose that at each time period, each base station updates how it transmits its own signal as a function of what the interfering base station previously sent. In this case the base stations will alternate transmission strategies, where each seeks to maximize its own link throughput without caring for the rate supported in the interfering base station. This may require many iterations, which take time and thus may not be practical in mobile channels, and further may not lead to a feasible solution.

Ideally, all the base stations would cooperate together, using what is known as cooperative MIMO or network MIMO (see e.g. G. J. Foschini, H. Huang, K. Karakayali, R. A. Valenzuela, and S. Venkatesan, "The value of coherent base station coordination," in Proc., Conference on Information Sciences and Systems (CISS), Johns Hopkins University, March 2005). In this concept, the base stations essentially get together and form a super MIMO transmitter and receiver. Unfortunately, this requires complete collaboration between base stations. For example, base stations must exchange their sampled waveforms with this approach. This requires an extremely high speed network backbone between base stations and does not seem feasible in most circumstances. Consequently, lower levels of cooperation are needed to provide limited cooperation between base stations but not require complete exchange of transmit and receive signals. A solution to this problem is described in the following paragraphs. FIG. 4 provides an overview of the system components of preferred embodiments of this invention. In the system there are two or more base transceiver station (BTS) 100 with a plurality of transmit antennas 125. BTS 100 communicates with a plurality of subscriber stations 105, which may be mobile or fixed, using wireless communication. Subscriber station 105 has a plurality of antennas, for the purpose of implementing MIMO wireless communication. The BTS 100 are connected through backhaul network 110. Backhaul network 110 facilitates exchange of information between BTS and provides connection to external networks such as the Internet and the Public Switched Telephone Network. An interference schedule (IS) control channel 405 is used to communicate information about spatial formatting strategies of neighboring BTS to subscriber stations 105. Subscriber stations 105 in response make measurements of their sensitivity to different interfering spatial formats and store this information in a spatial mode table (described further below with reference to FIG. 6). The IS control channel 405 is preferably a logical control channel used to convey information about the spatial modes of the interfering base stations. Essentially, the base transceiver station 105 gets as an input the schedules from the neighboring base transceivers stations, e.g., 107, which includes a space/time/frequency mapping table and an index of the spatial transmission strategy to be used for each transmission in the next transmission opportunity. Note that this information does not necessarily include other information such as the destination user or the rate, but this information may be included in some embodiments.

Base station 105 takes the information from neighboring base stations and broadcasts this information to all the users. In some embodiments, the information is broadcast in tabular format, such as:

| Mapping to PHY | Spatial Transmission Method |
| --- | --- |
| OFDM Symbol 1 | Multiplexing |
| OFDM Symbol 2 | Diversity |
| OFDM Symbol 3 | Diversity |
| OFDM Symbol 4 | No transmission |

The interference schedule feed forward control channel 405 may be broadcast to all subscriber stations or may be multicast to select subscriber stations. The multicast option is useful in the cases where users are at different edges of the cell with different primary interfering base stations. The control channel can be mapped in any number of ways to the physical channel.

An interference measurement (IM) control channel 410 is used to convey spatial mode tables from subscriber station 105 to BTS 100 in addition to channel quality information. A coordination channel (CC) 415 is used to exchange spatial mode schedules between multiple BTS 100 for the purpose of facilitating scheduling, producing information for the IS control channel 405, and interpreting data from the IM control channel 410. Using the CC control channel 415, each BTS in the system can schedule users taking into account the sensitivity of subscriber stations 105 to different kinds of spatial formatting by interfering BTS, thus improving overall system performance.

FIG. 5 is a block diagram illustrating an idealized preferred embodiment BTS 100. Data 200, in the form of bits, symbols, or packets for example, are scheduled for transmission by scheduler 530, and forwarded to modulation and coding block 205, then passed to the spatial formatting block 220, followed by transmission on a plurality of antennas 125. Spatial formatting block 220 may use any number of formatting methods known in the art including spatial multiplexing, space-time block coding, space-time trellis coding, delay diversity, the Alamouti code, double Alamouti space-time block code, preceding, beamforming, transmit antenna selection, and the like. In preferred embodiments, the modulation, coding and spatial formatting decisions are made jointly. Various functional components of illustrated system are shown as blocks in, e.g., FIGS. 5 and 6. One skilled in the art will recognize that these logical/functional blocks are for illustration only and that in an actual implementation, the various illustrated blocks may be realized as special purpose hardware, general purpose hardware running appropriate instructions sets, software commands, firmware commands, programmable logic, and combinations of the like.

Modulation and coding block 205 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding; or block coding. Other techniques may also be employed.

The rate chosen for transmission by modulation and coding block 205 and the choice of spatial formatting 220 is determined, at least in part, by coordinated link adaptation block 500. The inputs to coordinated link adaptation block 500 are scheduling decisions from scheduler block 530, spatial mode schedules 520 from interfering base stations received through coordination control channel 415, and channel quality information from channel quality information block 515 derived from IM control channel 410. In another preferred embodiment, scheduling, modulation, coding, and spatial formatting decisions are made jointly. The spatial formatting information for the scheduled users is output to the coordination control channel 415 and delivered to other BTS 100. This information allows BTS to coordinate their transmission schedules based on sensitivity of neighboring users to different spatial formatting methods. While not explicitly illustrated, it is obvious to those skilled in the art that OFDM (orthogonal frequency division multiplexing) modulation can be used. Further, any number of multiple access techniques could be used including but not limited to orthogonal frequency division multiple access; code division multiple access; frequency division multiple access; or time division multiple access. The multiple access technique may be combined with the modulation and coding 205 or the spatial formatting 220 blocks among others.

Scheduler 530 makes decisions about which among one or more users are chosen for transmission. Scheduler 530 may use any of the known scheduling disciplines in the literature including round robin, maximum sum rate, proportional fair, minimum remaining processing time, or maximum weighted sum rate. The actions of scheduler 530 are coordinated through multi-base schedule block 525. In one embodiment, neighboring BTS 100 take turns in being the lead BTS. The lead BTS makes scheduling decisions locally and reports the spatial formatting methods to be used by its scheduler users to other BTS through coordination control channel 415. Neighboring BTS then make their scheduling decisions in response to the kind of interference that will be generated by the lead BTS. In another preferred embodiment, multiple BTS make scheduling decisions jointly to maximize some joint performance metric.

Spatial mode schedules 520 are possibly compressed in compute rate allocation summary block 510 and broadcast, multicast, or unicast to the subscriber stations 105 through the IS control channel 405. Specifically, information about the interference spatial formatting to be expected by out-of-cell interference is contained in IS control channel 405.

Subscriber units return their respective sensitivity to different spatial formatting modes through IM control channel 410. Channel quality information is extracted from IM 410 in channel quality information block 515 as well as other information that can be used by the scheduler 530 and coordinated link adaptation block 500 to make scheduling decisions.

FIG. 6 is a block diagram illustrating an idealized preferred embodiment subscriber station 105. Subscriber station 105 has a plurality of receive antennas 130, connecting through RF circuitry (not shown) to a MIMO receiver signal processing block 250. Some of the key functions performed by MIMO receiver signal processing block 250 are channel estimation, signal quality estimation, and interference estimation. Inputs from channel estimation block 255, signal quality estimation block 600, and interference estimation block 605 are used to compute spatial mode table 610 along with the interference schedule information derived from IS control channel 405 sent by BTS 100. Inputs from channel estimation block 255, signal quality estimation block 600, and interference estimation block 605 are also used to compute channel quality information 615. Both the spatial mode table 610 and channel quality information 615 are packaged into IM control channel 410 and delivered back to base station 100.

Channel estimation block 255 may employ any number algorithms known in the art including least squares, maximum likelihood, maximum a posteriori, Bayes estimator, adaptive estimator, blind estimator, among others. Some algorithms exploit known information inserted into the transmitted signal in the form of training signals or training pilots, while others use structure in the transmitted signal such as cyclostationarity to estimate coefficients of the channel between a BTS and a subscriber station.

Estimate interference block 605 estimates some measure of the interference. In one embodiment, this block estimates the total interference power. In another preferred embodiment spatial correlation matrix of the interferer is estimated. In yet another preferred embodiment, block 605 estimates the total spatial correlation matrix of the received signal and subtracts out the spatial correlation due to the estimated channel and the estimated noise power. This task can be accomplished using techniques and algorithms that will be apparent to one skilled in the art as informed by the teachings contained herein and routine experimentation.

Estimate signal quality block 600 outputs some measure of performance corresponding to the desired signal. In one embodiment this estimate consists of a received signal power estimate. In another embodiment, block 600 provides an estimate of the received signal-to-noise ratio. In yet another embodiment, block 600 provides an estimate of the average received signal power, averaged over subcarriers in an OFDM system. This task can be accomplished using techniques and algorithms that will be apparent to one skilled in the art as informed by the teachings contained herein and routine experimentation.

Channel quality estimate block 615 provides information about the ability of a subscriber station to correctly decode the transmitted signal. There are many different functions that can be used by BTS 100 in scheduling and transmission decisions. For example, channel quality estimate block 615 may quantize an estimate of the channel in one embodiment. In another embodiment this block may compute some function of the estimated channel such as the norm of the channel matrix, singular values of the channel matrix, or average singular values of the channel matrix. Block 615 may also use the output of signal quality estimate block 600 to compute a measure such as the signal-to-interference-plus-noise ratio or the post-processing signal-to-interference-plus-noise ratio. Other information such as cyclic redundancy checks may be used to compute an estimate of the packet error rate in yet another embodiment.

Compute spatial mode table 610 determines the sensitivity of the subscriber to the spatial formatting currently being employed by an interferer (e.g. a neighboring BTS). Consider as an example the case where a subscriber station experiences interference from one dominant interfering BTS. The choice of spatial formatting used by the interfering BTS impacts the choice of spatial formatting for that subscriber. For example, it is well known from basic array processing theory that the number of signals that can be decoded using conventional linear array processing is a function of the number of receive antennas. Spatial multiplexing creates multiple signals that must all be decoded while transmit beamforming creates only a single signal that must be decoded. Thus if the interfering base station employs transmit beamforming, it is more likely that a spatial formatting approach that supports multiple streams, such as hybrid or spatial multiplexing, will work well for that subscriber station. Of course, this depends on the propagation environment. For example, if a subscriber station does not see significant interference power from an interfering base station then the subscriber station will not be sensitive to the spatial formatting employed by the interfering base station. As another example, the propagation channel between the interfering base station and the subscriber may be poorly conditioned. This means that signals arriving from the interfering base station are highly correlated. Thus even if the interfering base station uses a spatial formatting technique like spatial multiplexing, the subscriber station may be less sensitive to the spatial formatting method employed. It will be clear to those skilled in the art that spatial formatting methods that send few substreams create an interference signal that is highly correlated. It is also clear to those skilled in the art that a channel between the interfering base station and the subscriber that is not well conditioned will also create an interfering signal that is highly correlated. The preferred embodiments of the present invention is preferably able to distinguish these two cases thanks to the interference schedule control channel 405, which is broadcast from the BTS.

Interference schedule control channel 405 informs all the appropriate subscribers about the transmission plans of neighboring and thus interfering BTS. In a preferred embodiment, the interference schedule control channel 405 carries information about the interfering spatial mode schedules for one or more neighboring base stations. In this embodiment, a table may be broadcast for each interfering BTS that indicates the planned spatial formatting technique in each time/frequency allocation. In another preferred embodiment, the interference schedule control channel 405 carries compressed spatial mode schedules for one or more neighboring base stations. In this case the table may be compressed using a data compression algorithm known to those skilled in the art. It is clear to those skilled in the art that the interference schedule control channel 405 can be implemented as a logical control channel or as a physical control channel.

The spatial mode table computation block 610 determines the sensitivity of the subscriber station to the spatial formatting mode employed by the interferer. For this purpose, during each time/frequency transmission, block 610 uses information from interference schedule control channel 405 to determine the spatial formatting employed by the interferer. It then applies an algorithm to estimate the highest rate transmission strategy that may be employed in the current estimated channel assuming the interferer uses the same spatial formatting strategy.

In a preferred embodiment, the spatial mode table records the preferred modulation, coding, and spatial formatting based on the current channel estimate conditioned on the interference spatial formatting strategy. In another embodiment, the spatial mode table records just the preferred spatial formatting strategy conditioned on an interfering spatial formatting strategy. In yet another embodiment, the spatial mode table records the rate achieved for each spatial formatting strategy possible.

Spatial formatting table block 610 may accumulate multiple observations and combine them to improve the quality of the spatial mode table. It may also reset from time-to-time to compensate for changing channel and interference conditions.

To use interference schedule control channel 405, the subscriber station must know the source of interfering BTS. In a preferred embodiment, interfering BTS are obtained through the handoff search process, where the subscriber measures the pilots of neighboring BTS. In another embodiment, geographic location methods such as GPS or the like are used to determine the subscriber station location and thus the most likely interfering BTS.

FIG. 7A illustrates a preferred embodiment the spatial mode table 700, which is used in compute spatial mode table block 610. In this example, there are two spatial modes 705, a beamforming mode and a spatial multiplexing mode. A single strong interferer is assumed. Optionally there is also a no transmission option. Based on inputs from channel estimation block 255, signal quality estimation block 600, and interference estimation block 605, the preferred spatial mode conditioned on the interfering mode is calculated and stored in the table. Many observations may be averaged or otherwise combined to determine the preferred mode. Although a single strong interfering base station is illustrated for purpose of this discussion, one skilled in the art will recognize that the teachings contained herein can be readily extended to, e.g., other interferers in the wireless network, two or more interfering base stations, and the like.

FIG. 7B illustrates another preferred embodiment spatial mode table 710, which is used in compute spatial mode table block 610. In this example, there are two spatial modes 705 a beamforming mode and a spatial multiplexing mode. A single strong interferer is assumed. Optionally there is also a no transmission option. Based on inputs from channel estimation block 255, signal quality estimation block 600, and interference estimation block 605, the preferred modulation and also the preferred coding rate for each spatial transmission format is recorded in the table. Many observations may be averaged or otherwise combined to determine the preferred mode.

FIG. 8 illustrates a preferred embodiment computational flow chart, which is used in compute spatial mode table block 610. In this example, the channel is first estimated 800. Then the spatial covariance matrix of the interference is derived from the spatial covariance of the total signal in 805. A spatial whitening filter is derived from the interference plus noise covariance matrix in 810. The expected rate corresponding to the whitened channel is computed in 815. The achievable rate is then recorded as appropriate in the spatial mode table in 820. There are two spatial modes: a beamforming mode and a spatial multiplexing mode. Again, a single strong interferer is assumed, but this is not a limitation on the illustrated technique. Optionally there is also a no transmission option. Based on inputs from channel estimation block 255, signal quality estimation block 600, and interference estimation block 605, the preferred modulation and coding rate for each spatial transmission format is recorded in the table. Many observations may be averaged or otherwise combined to determine the preferred mode.

The computational flowchart 800 of FIG. 8 may be explained through mathematical equations in the following preferred embodiment. For a narrowband MIMO communication system, the signal at the subscriber 105 in discrete-time may be written as $$y = Hx + v_I + v$$

where H is the channel, x is the transmitted signal vector, $v_I$ is the interfering signal vector and v is noise. In step 800, the channel H is estimated using any number of algorithms known in the art. Using channel H, the next step is to compute the total signal covariance matrix $Ry = E\, y\, y^*$ where * is conjugate transpose. This may be done in the usual way using a sample average. Then the interference covariance matrix $Rv_I = E\, v_I\, v_I^*$ can be computed as $Rv_I = Ry - H\, Rx\, H^* + Rv$ where Rx is the covariance matrix of the transmitted vector x (determined from the spatial formatting matrix) and Rv is the noise covariance matrix. Then a spatial whitening filter in 810 is derived from $Rv_I + Rv$ by computing the Cholesky decomposition for example. This is written as $Rv_I^{1/2}$. Then the whitening filter is applied to the received signal to produce $Rv_I^{1/2} y = Rv_I^{1/2} H\, x + Rv_I^{1/2} v_I + Rv_I^{1/2} v$ where $Rv_I^{1/2} H$ is the whitened channel and $Rv_I^{1/2}(v_I + v)$ is the whitened noise. The expected rate in 815 is computed from the whitened channel and the whitened interference plus noise term. For example, it could be computed using Shannon's formula as $\log(I + Rv_I^{1/2} H\, Rx (I + Rv_I R_v)^{-1} H^* Rv_I^{1/2*})$ in one embodiment. The spatial mode table can then be updated accordingly.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular processes, algorithms, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A system for wireless communication comprising:
a plurality of base transceiver stations, each respective base transceiver station having
a plurality of antennas;
a network connecting the base transceiver stations;
an interference schedule forward control channel configured to send interference training signals from one of the base transceiver stations to an associated subscriber station; and
an interference measurement reverse control channel configured to receive preferred transmission mode data from the associated subscriber station by the one of the base transceiver stations;
wherein the plurality of base transceiver stations are configured to inter-communicate spatial mode schedules and scheduling decisions;
further comprising a multi-base scheduling function configured to coordinate actions of the scheduling decisions;
wherein the multi-base scheduling function is configured to:
designate each of the base transceiver stations as a lead base transceiver station in a serial fashion;
allow the lead base transceiver station to make scheduling decisions locally for the duration of the lead base transceiver station designation;
report from the lead base transceiver station to other base transceiver stations spatial formatting methods to be used by the designated lead base transceiver station; and
allow each base transceiver station that is not currently designated as the lead base transceiver station to make respective scheduling decisions in response to a kind of interference that will be generated by the reported spatial formatting methods to be used by the designated lead base transceiver station.

2. The system of claim 1 wherein the plurality of base transceiver stations are further configured to inter-communicate the following information:
coordinated link adaptation information based on the spatial mode schedules;
rate allocation summary computation based on the spatial mode schedules;
modulation and coding decisions; and
spatial formatting decisions.

3. The system of claim 2 wherein the plurality of base transceiver stations are configured to make the modulation and coding, and spatial formatting decisions jointly.

4. The system of claim 1 wherein the scheduling decisions are configured to be determined by an algorithm selected from a group consisting of round robin, maximum sum rate, proportional fairness, minimum remaining processing time, and maximum weighted sum rate.

5. The system of claim 1 wherein the preferred transmission mode data is selected from the group consisting of spatial multiplexing, space-time block coding, space-time trellis coding, transmit beamforming, transmit preceding, delay diversity, Alamouti coding, double Alamouti space-time block coding, closed loop MIMO, and transmit antenna selection, and combinations thereof.

6. The system of claim 5 wherein spatial formatting is configured to be performed in conjunction with a multiple access technique selected form the group consisting of orthogonal frequency division multiple access, code division multiple access, frequency division multiple access, and time division multiple access.

7. A communication protocol for a wireless communication network having a plurality of base transceiver stations, each of the plurality of base transceiver stations having associated therewith a respective plurality of subscriber stations, the protocol comprising:
a network inter-connecting the plurality of base transceiver stations;
an interference schedule control channel whereby interferer information is fed from a respective base transceiver station to the respective plurality of subscriber stations associated therewith; and
an interference measurement control channel whereby preferred transmission mode data is fed from each respective subscriber station to the respective base transceiver station associated therewith; and wherein the preferred transmission mode data is determined at least in part from the interferer information;
wherein the plurality of base transceiver stations are configured to inter-communicate spatial mode schedules and scheduling decisions;
further comprising a multi-base scheduling function configured to coordinate actions of the scheduling decisions;
wherein the multi-base scheduling function is configured to:
designate each of the plurality of base transceiver stations as a lead base transceiver station in a serial fashion;
allow the lead base transceiver station to make scheduling decisions locally for the duration of the lead base transceiver station designation;
report from the lead base transceiver station to other base transceiver stations spatial formatting methods to be used by the designated lead base transceiver station; and
allow each base transceiver station that is not currently designated as the lead base transceiver station to make respective scheduling decisions in response to a kind of interference that will be generated by the reported spatial formatting methods to be used by the designated lead base transceiver station.

8. The communication protocol of claim 7 wherein the network inter-connecting the plurality of base transceiver stations is a wire-line network.

9. The communication protocol of claim 7 wherein the interference schedule control channel is defined as a sequence of bits transmitted as part of a standard telecommunications protocol.

10. The communication protocol of claim 7 wherein the preferred transmission mode is a spatial mode selected from the group consisting of spatial multiplexing, space-time block coding, space-time trellis coding, transmit beamforming, transmit precoding, delay diversity, Alamouti code, double Alamouti space-time block code, closed loop MIMO, and transmit antenna selection.

11. A subscriber station comprising:
a plurality of antennas;
an interference schedule forward control channel configured to receive interference training signals from a base transceiver station by the subscriber station; and
an interference measurement reverse control channel configured to send preferred transmission mode data from the subscriber station to the base transceiver station;
wherein the base transceiver station comprises a network interface configured to connect to other base transceiver stations;
wherein the other base transceiver stations are configured to inter-communicate spatial mode schedules and scheduling decisions;
further comprising a multi-base scheduling function configured to coordinate actions of the scheduling decisions;
wherein the multi-base scheduling function is configured to:
designate each of the other base transceiver stations as a lead base transceiver station in a serial fashion;
allow the lead base transceiver station to make scheduling decisions locally for the duration of the lead base transceiver station designation;
report from the lead base transceiver station to other base transceiver stations spatial formatting methods to be used by the designated lead base transceiver station; and
allow each base transceiver station that is not currently designated as the lead base transceiver station to make respective scheduling decisions in response to a kind of interference that will be generated by the reported spatial formatting methods to be used by the designated lead base transceiver station.

12. The subscriber station of claim 11 further comprising:
a multiple-input multiple-output (MIMO) receiver comprising
a channel estimation module;
an interference estimation module;
a signal quality estimation module; and
a spatial mode table computation module.

13. The system of claim 12 wherein the channel estimation module uses an estimator selected from the group consisting of least squares, maximum likelihood, maximum a posteriori, Bayes estimator, adaptive estimator, blind estimator, and combinations thereof.

14. The system of claim 12 wherein the channel estimation module uses known transmitted signals selected from the group consisting of training symbols, training pilots, and combinations thereof.

15. The system of claim 12 wherein the interference estimation module estimates a characteristic of interference selected from the group consisting of total interference power, spatial correlation matrix of an interferer, total correlation matrix of a received signal minus contributions from a received signal and noise power, and combinations thereof.

16. The system of claim 12 wherein the signal quality estimation module estimates a characteristic of signal quality selected from the group consisting of received signal power, received signal-to-noise ratio, average received signal power, total received signal power, and combinations thereof.

17. A base transceiver station comprising:
a plurality of antennas;
a network interface configured to connect to other base transceiver stations;
an interference schedule forward control channel configured to send interference training signals from the base transceiver station to a subscriber station;
an interference measurement reverse control channel configured to receive preferred transmission mode data from the subscriber station by the base transceiver station;
wherein the other base transceiver stations are configured to inter-communicate spatial mode schedules and scheduling decisions;
further comprising a multi-base scheduling function configured to coordinate actions of the scheduling decisions;
wherein the multi-base scheduling function is configured to:
designate each of the other base transceiver stations as a lead base transceiver station in a serial fashion;
allow the lead base transceiver station to make scheduling decisions locally for the duration of the lead base transceiver station designation;
report from the lead base transceiver station to other base transceiver stations spatial formatting methods to be used by the designated lead base transceiver station; and
allow each base transceiver station that is not currently designated as the lead base transceiver station to make respective scheduling decisions in response to a kind of interference that will be generated by the reported spatial formatting methods to be used by the designated lead base transceiver station.

18. The base transceiver station of claim 17, further configured to inter-communicate the following information:

coordinated link adaptation information based on the spatial mode schedules;
rate allocation summary computation based on the spatial mode schedules;
modulation and coding decisions; and
spatial formatting decisions.

19. The base transceiver station of claim 18 wherein the base transceiver station is configured to make the modulation and coding, and spatial formatting decisions jointly with the other base transceiver stations.

20. The base transceiver station of claim 17 wherein the scheduling decisions are configured to be determined by an algorithm selected from a group consisting of round robin, maximum sum rate, proportional fairness, minimum remaining processing time, and maximum weighted sum rate.

21. The base transceiver station of claim 17 wherein the preferred transmission mode data is selected from the group consisting of spatial multiplexing, space-time block coding, space-time trellis coding, transmit beamforming, transmit precoding, delay diversity, Alamouti coding, double Alamouti space-time block coding, closed loop MIMO, and transmit antenna selection, and combinations thereof.

22. The base transceiver station of claim 21 wherein spatial formatting is configured to be performed in conjunction with a multiple access technique selected form the group consisting of orthogonal frequency division multiple access, code division multiple access, frequency division multiple access, and time division multiple access.

* * * * *